United States Patent [19]

Lindqvist

[11] Patent Number: 4,535,207
[45] Date of Patent: Aug. 13, 1985

[54] SAFETY DEVICE IN AN OPERATING UNIT FOR AN INDUSTRIAL ROBOT

[75] Inventor: Ake Lindqvist, Västerås, Sweden

[73] Assignee: ASEA Aktiebolag, Västerås, Sweden

[21] Appl. No.: 503,122

[22] Filed: Jun. 10, 1983

[30] Foreign Application Priority Data

Jun. 24, 1982 [SE] Sweden .................................. 8203945

[51] Int. Cl.³ .............................................. H01H 9/54
[52] U.S. Cl. .................. 200/17 R; 200/6 A; 901/49
[58] Field of Search ............. 200/6 A, 5 R, 5 A, 157, 200/17 R, 52 R; 340/365 R, 712, 709; 364/193, 513, 513.5; 901/2, 3, 4, 11, 12, 13, 16, 19, 20, 49, 50; 361/115

[56] References Cited

U.S. PATENT DOCUMENTS

| Re. 31,208 | 4/1983 | Watanabe | 901/3 X |
|---|---|---|---|
| 2,841,659 | 7/1958 | Eitel | 200/6 A X |
| 3,212,649 | 10/1965 | Johnson et al. | 901/49 X |
| 3,247,979 | 4/1966 | Melton et al. | 200/157 X |
| 3,271,532 | 9/1966 | Lopez | 200/6 A |
| 3,280,991 | 10/1966 | Melton et al. | 901/20 X |
| 3,293,381 | 12/1966 | Eitel | 200/6 A |
| 3,608,743 | 9/1971 | Mosher et al. | 901/48 X |
| 4,408,103 | 10/1983 | Smith, III | 200/6 A |
| 4,465,908 | 8/1984 | Griffith et al. | 200/17 R X |

FOREIGN PATENT DOCUMENTS 1525064 8/1969 Fed. Rep. of Germany .
631818 8/1982 Switzerland .
633119 11/1982 Switzerland .

Primary Examiner—J. R. Scott
Attorney, Agent, or Firm—Pollock, Vande Sande & Priddy

[57] ABSTRACT

An operating unit for an industrial robot is provided with hand-sensing device arranged in such a way that, when an operator operates the robot with the aid of a joystick, the operator's hand rests on the hand-sensing device enabling the joystick to be operated with the fingers of the same hand. Suitably the hand-sensing device includes a plate and a transducer sensing the presence of the operator's hand when it rests on the plate. The transducer influences a control unit which only allows the joystick to influence the robot when a hand is sensed by the hand-sensing device when the hand rests on the plate.

9 Claims, 3 Drawing Figures

SAFETY DEVICE IN AN OPERATING UNIT FOR AN INDUSTRIAL ROBOT

BACKGROUND OF THE INVENTION

1. Field of the Invention

This invention relates to an operating unit for an industrial robot comprising a hand operated joystick for control of the movement of the robot when programming the robot.

2. Description of the Prior Art

An industrial robot can be controlled with the aid of a control lever or joystick. During a teaching or programming procedure, the position or orientation of the robot tool, or both, can be controlled in the desired manner by means of the joystick. The joystick can either be arranged on a fixed control cabinet or on a smaller, separate programming unit, which during programming or teaching can be held in the hand or be placed on a table.

In order that programming shall not take an unreasonably long time, it is necessary that a full deflection of the joystick causes a movement with a relatively high speed of response in the robot. During the teaching procedure it may be necessary for personnel to stay in the vicinity of the robot. A sudden movement of the robot may therefore cause personal injury and possibly also material damage. Furthermore there is a certain risk that operating personnel, during the programming period, may unitentionally touch the joystick possibly resulting in a full deflection, which could result in injury or damage as mentioned above.

SUMMARY OF THE INVENTION

The present invention aims to provide, in an operating unit for an industrial robot, a safety device with the aid of which the above-mentioned risks are eliminated.

During a teaching procedure it is desirable and often necessary that the operator should be able to stay in the immediate vicinity of the robot and from there control the robot movement, for example by means of a portable operating unit. The operator should then have the greatest possible freedom of movement and freedom to assume different operating positions, and he should have the possibility of holding the operating unit in an arbitrary position during operation of the robot.

It is therefore a further object of the invention to provide an operating unit which, at the same time, fulfills these desirable aims.

According to the present invention an operating unit for an industrial robot comprises a hand operated joystick for controlling the movement of the robot when programming the robot, transducer means arranged to sense the presence of a hand of an operator when said hand is placed on the operating unit for operating the joystick with the fingers of the same hand and control means influenced by the transducer means to prevent the joystick from controlling the movement of the robot when the transducer means does not sense the presence of the operator's hand.

BRIEF DESCRIPTION OF THE DRAWINGS

Embodiments of the invention will now be described, by way of example, with reference to the accompanying drawings, in which.

DESCRIPTION OF THE PREFERRED EMBODIMENT

Figure 1A:
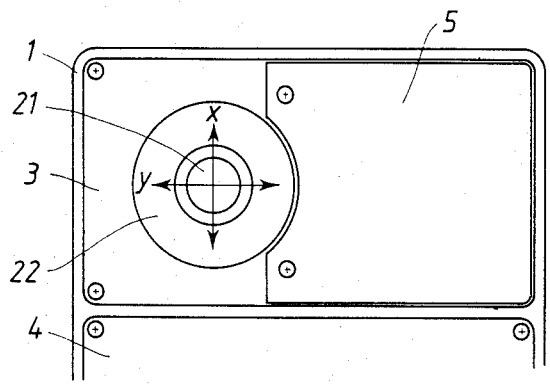
FIGS. 1a, 1b and 1c show views in plan from above, in side elevation and in cross-section, respectively, of an embodiment of an operating unit for an industrial robot according to the invention.

The operating unit shown in the figures is intended to be used during programming of an industrial robot, not shown. FIG. 1a shows that portion of the operating unit which, as seen by an operator, is located furthest to the right for a right-handed person. On the upper surface of the unit there is arranged a covering plate 3 on which a joystick 2 is mounted. The joystick 2 is movable both in the lateral direction as seen by the operator (the arrows marked x in FIG. 1a), and in the longitudinal direction (the arrows marked y in FIG. 1a). Movement in a third degree of freedom can be obtained by rotating a knob 21 of the joystick or by displacing the knob 21 upwards and downwards. Movement in additional degrees of freedom may also possibly be arranged. A rubber bellows 22 serves as a seal between the joystick 2 and the covering plate 3.

The operating unit includes a further covering plate 4, of which only a part is shown in FIG. 1a on which further operating members, such as pushbuttons, or like, and video display members may be mounted.

Figure 1B:
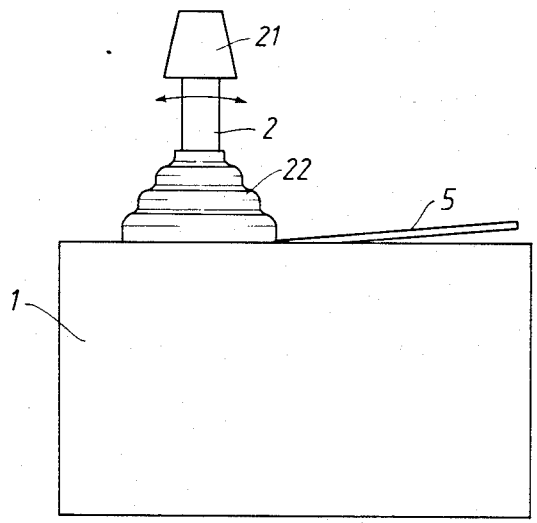
Figure 1C:
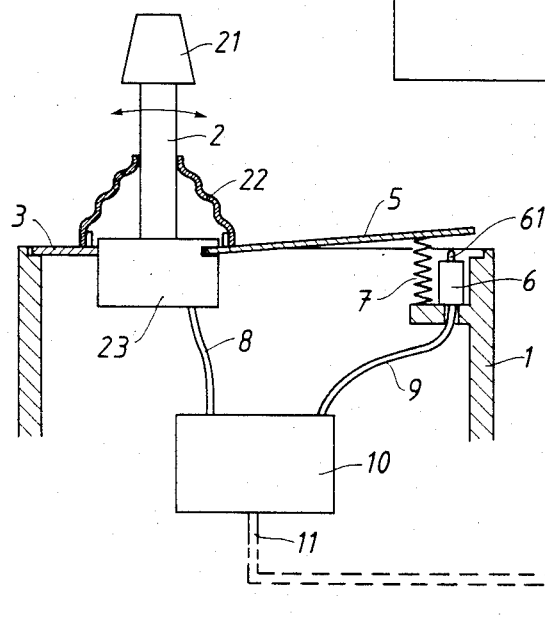

In a lower portion 23 of the joystick shown in FIG. 1c, potentiometers or other members known per se are arranged for coverting the joystick deflection into electrical signals for operation of the robot. The potentiometers or corresponding members are connected via a cable 8 to a control unit 10, which via further cables 11 is connected to a control member, not shown, which operates drive members, not shown, of the robot in the different degrees of freedom.

In that portion of the upper surface of the operating unit which is located between the joystick 2 and the operator, there is arranged a movable covering plate 5, the covering plate 5 being connected to the operating unit along an edge adjacent the joystick, by means of hinges or other resilient or elastic members, which give the plate 5 a certain feeedom of movement in the vertical direction. A spring 7 normally maintains the covering plate 5 in an upper hinged position, as seen in FIG. 1c. A microswitch 6, shown in FIG. 1c, having an operating arm 61 is arranged in the operating unit and is mounted in such a way that its operating arm 61 is influenced by the covering plate 5 when the covering plate is pressed down against the resilient urging of the spring 7. The microswitch 6 is connected, via a cable 9, to the control unit 10 and influences the latter in such a way that, when the covering plate 5 is in its upper hinged position, as shown in FIGS. 1a, 1b and 1c, and the operating arm 61 is not depressed, the joystick 2 is rendered completely inactive; that is, a movement of the joystick 2 does not give rise to a movement of the robot. In case of inadvertent contact with the joystick 2, all risks of personal injury and material damage are therefore completely eliminated.

When it is desired, during a teaching procedure, for the robot to be displaced by means of the joystick 2, the operator places his hand on top of the covering plate 5, causing the latter to pivot downardly about its hinge and to press down and actuate the operating arm 61 of the microswitch 6. The actuation of the arm 61 of the microswitch 6 is sensed, via the cable 9, by the control unit 10 which then allows the robot to respond to movements of the joystick. By operating the joystick, for example with the thumb and the index finger, while the heel of the same hand rests on the covering plate 5, the operator is then able to operate the robot in the desired manner. As soon as the heel of the hand is removed from the operating unit, even though the joystick may continue to be grasped between the thumb and the index finger, the spring 7 urges the covering plate 5 into its upper hinged position, and a signal is supplied, via the microswitch 6, to the control unit 10, which renders the joystick inactive.

The embodiment of the invention described above is only one example of the invention. Within the scope of the invention, the operating unit can be designed in a great number of different ways. The above-described transducer with a movable, spring-loaded plate 5, on which the hand rests when operating the joystick and which influences a microswitch 6, is simple, reliable and inexpensive. However, instead of this transducer design it is, of course, possible to use other forms. For example, it is possible to use a substantially fixed plate on which the hand rests and whereby force-sensing members, for example strain gauges, are arranged to sense the force by which the hand influences the plate. A further alternative is to arrange, in the plate on which the hand rests when operating the joystick, a capacitive transducer of the type which is used in so-called touch keyboards or touch-operated switches.

An operating unit according to the invention offers great advantages and offers a solution to the problems which are specific to the programming of industrial robots. During operation the natural operating position is for the heel of one hand to rest on the plate in such a position that the joystick can be operated with the fingers of the same hand. With this operating position, the following advantages are obtained, namely:

(a) Both the fulfillment of the safety function and the operation of the robot are performed with one hand, leaving the other hand free to enable it to be used, for example, to hold the operating unit, to carry out other operating functions, or as a support in certain operating positions;

(b) The hand which is used for operating the joystick is completely supported against the plate, which as far as possible reduces the load for the operator.

Preferably the operating unit is so designed that it may easily be converted for use by a left-handed operator by moving the joystick and safety plate to the left-hand side of the unit.

The safety plate may prevent the joystick from causing movement of the robot in several ways. One way is to prevent the joystick displacement signals from reaching or influencing the control unit. Another way is to connect the safety plate in such a manner that the power supply to servo systems of the drive motors of the robot is disconnected when the safety plate does not sense the presence of the operator's hand. By disconnecting the power supply to the servo systems there will be no current or voltage supplied to the motors and therefore movement of the robot will be effectively prevented. Preferably this disconnection of the power supply to the servo systems by means of the safety plate is active only when the robot is being programmed or a program is being test run from the operating unit.

What is claimed is:

1. An operating unit for an industrial robot, said operating unit comprising:

a hand operated joystick for controlling the movement of such a robot when programming it;

transducer means for sensing the presence of the heel of the hand of an operator when the same hand is resting on said transducer means while fingers of the same hand are operating said joystick, said transducer means being positioned so that during operation of said joystick, the heel of the operator's hand rests thereon; and control means operatively associated with said transducer means and said joystick for preventing said joystick from controlling the movement of such a robot when said transducer means does not sense the presence of the heel of the operator's hand.

2. An operating unit according to claim 1, wherein said transducer means senses the force which the hand exerts thereon.

3. An operating unit according to claim 1, wherein said transducer means comprises a position transducer and a movable spring-loaded plate on which the operator's hand rests, said plate being arranged to influence said position transducer when said plate moves in response to the presence of the hand.

4. An operating unit according to claim 3, wherein said position transducer comprises a microswitch having output means connected to said control means, said microswitch being opened and closed by movement of said plate.

5. In an industrial robot system, an improved operating unit comprising:

a hand operated joystick for controlling the movement of such a robot when programming it;

transducer means for sensing the presence of the heel of the hand of an operator when the same hand is resting on said transducer means while fingers of the same hand are operating said joystick, said transducer means being positioned so that during operation of said joystick, the heel of the operator's hand rests thereon; and control means operatively associated with said transducer means and said joystick for preventing said joystick from controlling the movement of such a robot when said transducer means does not sense the presence of the heel of the operator's hand.

6. In an industrial robot system according to claim 5, wherein said control means prevents said joystick from controlling the robot by disconnecting the power supply to the robot drive system when said transducer means does not sense the presence of the heel of the operator's hand.

7. In an industrial robot system according to claim 5, wherein said transducer means senses the force which the hand exerts thereon.

8. In an industrial robot system according to claim 5, wherein said transducer means comprises a position transducer and a movable spring-loaded plate on which the operator's hand rests, said plate being arranged to influence said position transducer when said plate moves in response to the presence of the hand.

9. In an industrial robot system according to claim 8, wherein said position transducer comprises a microswitch having output means connected to said control means, said microswitch being opened and closed by movement of said plate.

* * * * *